United States Patent [19]

Belart

[11] 4,251,114
[45] Feb. 17, 1981

[54] BRAKE VALVE
[75] Inventor: Juan Belart, Walldorf, Fed. Rep. of Germany
[73] Assignee: ITT Industries, Inc., New York, N.Y.
[21] Appl. No.: 25,432
[22] Filed: Mar. 30, 1979
[30] Foreign Application Priority Data
Apr. 27, 1978 [DE] Fed. Rep. of Germany ....... 2818533
[51] Int. Cl.³ .............................................. B60T 15/02
[52] U.S. Cl. ..................................... 303/6 A; 303/52
[58] Field of Search .................... 303/6 A, 52, 50, 56, 303/54; 60/563, 562, 558, 547

[56] References Cited
U.S. PATENT DOCUMENTS
3,692,367 9/1972 Kuromitsu ............................. 303/52
3,830,549 8/1974 Kito et al. ......................... 303/52 X FOREIGN PATENT DOCUMENTS
1293001 3/1961 France .

Primary Examiner—Douglas C. Butler
Attorney, Agent, or Firm—John T. O'Halloran; Alfred C. Hill

[57] ABSTRACT

A brake valve comprising two coaxial, tandemly arranged control spools each connecting a different one of two brake circuits to either an associated pressure fluid source or an associated unpressurized reservoir. A first of the two control spools is actuated mechanically by a brake pedal and the second of the two control spools is actuated by the brake pressure controlled by the first of the two control spools. In order for the second of the two control spools to meter the same pressure into the associated brake circuit as the first of the two control spools, the second of the two control spools has two additional effective surfaces, one of which is acted upon by the brake pressure controlled by the first of the two control spools in the direction of actuation and the other of which is acted upon by the brake pressure metered into that one of the two brake circuits controlled by the second of the two control spools.

14 Claims, 1 Drawing Figure

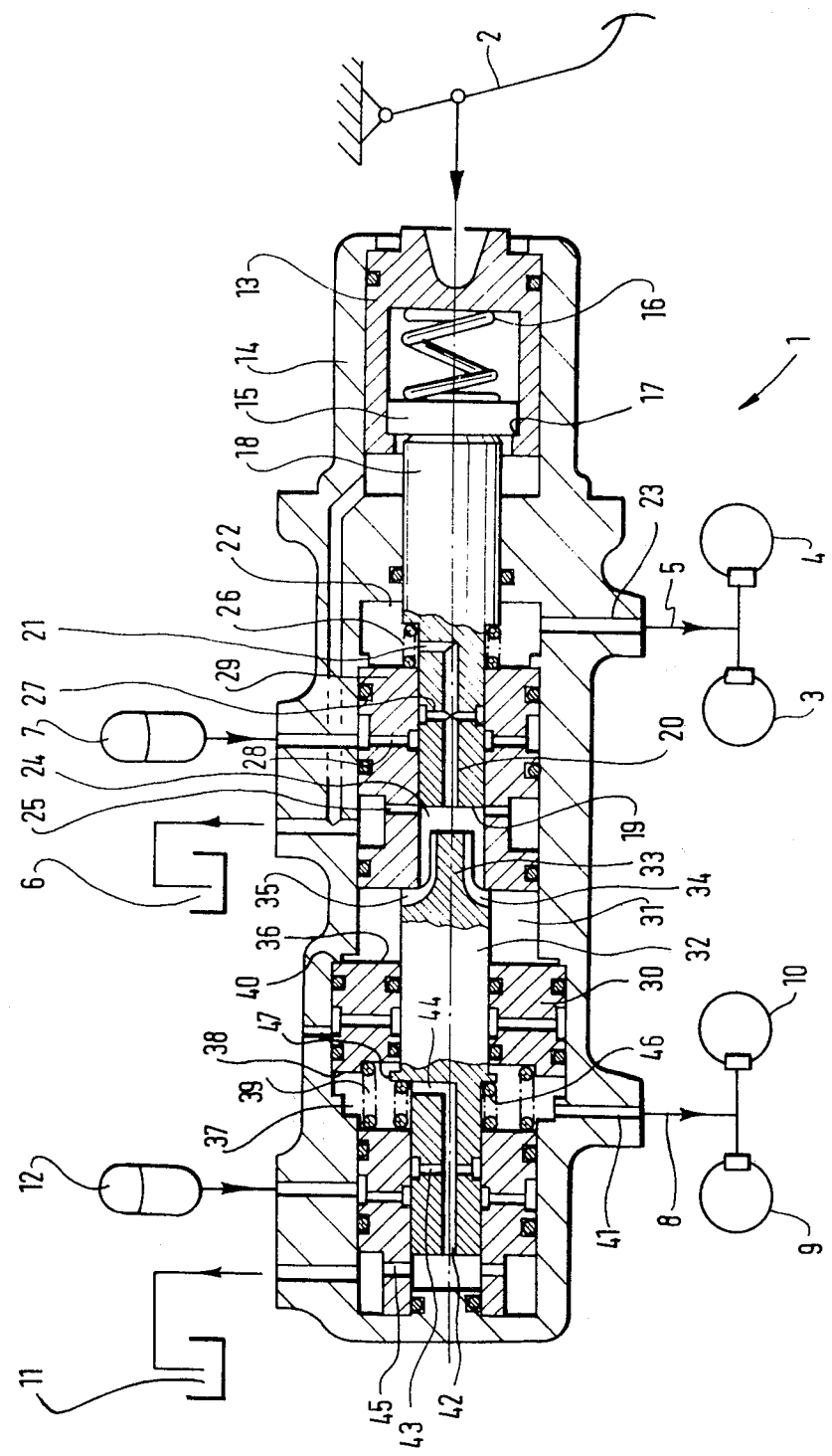

BRAKE VALVE

BACKGROUND OF THE INVENTION

This invention relates to a brake valve including two control spools each providing for connection of a brake circuit to either a fluid source or an unpressurized reservoir, wherein the first control spool is displaceable mechanically by means of a brake pedal and the second control spool is displaceable hydraulically by the second control spool being assigned a pressure chamber which is in permanent communication with the brake circuit associated with the first control spool and into which the second control spool extends with an effective front surface. Such a brake valve is described in French Pat. No. 1,293,001.

In a brake valve so constructed, the brake pressure metered into the first brake circuit controls the control spool of the second brake circuit. In the event of failure of the first brake circuit because of a defect, it is possible to bring the first control spool into abutment with the second control spool by means of the brake pedal and to thus displace the second control spool mechanically so that actuation of the brake circuit associated with the second control spool continues to be ensured. When viewed from the safety angle, the brake valve of this type is required to actuate two brake circuits independently of one another.

A disadvantage of this prior art brake valve is that pressure is allowed to develop in the brake circuit associated with the second control spool only when the pressure in the first brake circuit has reached a magnitude sufficient to overcome the frictional forces of the second control spool. The result is that on brake actuation the second brake circuit always responds later than the first brake circuit. In practice, the second control spool's frictional forces cause pressure differences of 7 to 8 bars between the two brake circuits which is hardly acceptable because of reasons of safety. Particularly in brake systems with diagonally split brake circuits it is essential for the brakes of both brake circuits to respond concurrently and to have identical pressures in both brake circuits.

SUMMARY OF THE INVENTION

It is an object of the present invention to design a brake valve such that both brake circuits respond approximately simultaneously and that the pressures in both brake circuits are subject to the least possible influence by the frictional forces of the control spool.

A feature of the present invention is the provision of a brake valve comprising: a housing having a longitudinal axis; a first control spool disposed in the housing coaxial of the axis to connect a first brake circuit to a first unpressurized reservoir in its rest position and to connect the first brake circuit to a first fluid source in its actuated position; a second control spool disposed in the housing coaxial of the axis and in tandem relation with the first control spool to connect a second brake circuit to a second unpressurized reservoir in its rest position and to connect the second brake circuit to a second fluid source in its actuated position; a brake pedal coupled to the first control spool for mechanical actuation thereof; a pressure chamber disposed in the housing in permanent communication with the first brake circuit for hydraulically actuating the second control spool, the second control spool having a first effective surface in the pressure chamber; and two additional opposed effective surfaces associated with the second control spool, a first of the two additional effective surfaces being acted upon by pressure in the pressure chamber and a second of the two additional effective surfaces being acted upon by pressure in a counter-pressure chamber in premanent communication with the second brake circuit.

By this arrangement, the first effective surface of the second control spool is exposed to the pressure metered into the first brake circuit on brake actuation. When the pressure developing in the second brake circuit corresponds to the pressure in the first brake circuit, the first effective surface diminishes as a result of the second effective surface being exposed to the pressure in the second brake circuit and acting in opposition to the first effective surface. This design results in a practically simultaneous response of the two brake circuits and the pressure differences occurring are negligible.

The brake valve of the invention is also suitable for use in brake systems or other hydraulic systems utilizing more than two independent circuits by the addition of further control spools, without departing from its principle structure.

In an advantageous embodiment of the invention, the effective surfaces are provided on an annular piston which is sealably arranged on the second control spool, held in the normal position aganst a stop formed in the housing by a weak spring and displaceable into abutment with a collar on the second control spool against the force of this spring.

The annular piston remains in abutment with the stop formed in the housing if the pressure in the first brake circuit fails because of a defect. Therefore, the brake valve of the invention may be so designed that the reaction force at the brake pedal remains unchanged in the event of failure of a brake circuit. It is another advantage in this embodiment that on each brake application the annular piston is initially slightly displaced relative to both the housing of the brake valve and the second control spool. It is thereby ensured that the seals do not stick after a prolonged period of service and are not eventually damaged or destroyed when a major displacement of the annular piston occurs.

In another advantageous embodiment of the invention, the effective surfaces of the annular piston are of equal size.

In this embodiment, the action of the annular piston is fully compensated as soon as the pressures in both brake circuits have reached a state of equilibrium. When a pressure increase occurs because of displacement of the first control spool, the pressure of the first brake circuit initially acts on both the effective surface of the second control spool and the effective surface of the annular piston. The frictional forces of the second control spool are thereby overcome easily. Because the pressures in both brake circuits are nearly identical, the brake valve of the invention is even suitable for use in brakes systems utilizing diagonally-split circuits.

In another embodiment of the invention, wherein the first effective surface of the annular piston is greater than the second effective surface, the annular piston, on brake actuation, exerts a force on the second control spool in the actuating direction so long as the first brake circuit is operative. By these means, the reaction force will change in the event of failure of any one of the two brake circuits, thus enabling the vehicle operator to become aware of the defect without the presence of a warning arrangement.

In order to permit actuation of the second control spool in the event of failure of the first brake circuit, it is advantageous to arrange the two control spools coaxially in tandem.

In still another advantageous embodiment of the invention, the permanent fluid connection of the pressure chamber associated with the second control spool to the first brake circuit is established by means of a longitudinal bore in the first control spool, which bore extends from the first control spool's front surface remote from the brake pedal to connect with the first brake circuit through a cross bore. This design permits particularly simple and lowcost manufacture because it eliminates the necessity of providing channels in the housing of the brake valve.

In a still further advantageous embodiment of the invention, the lost travel is reduced in the event of failure of the brake circuit associated with the first control spool by arranging the second control spool so it projects with an extension into the control housing of the first control spool, the extension being provided with longitudinal grooves establishing a fluid connection to the pressure chamber of the second control spool. This design has the added advantage of providing a particularly simple fluid connection of the first brake circuit to the pressure chamber between the two control spools.

It is another advantage if the front surface of the first control spool forms a control edge for a reservoir connecting channel. In this design, the pressure chamber is in a simple manner connectable with the reservoir in the normal position.

In another embodiment of the invention, it is an advantage to establish the permanent fluid connection of the counter-pressure chamber to the reservoir by means of a cross bore and a longitudinal bore in the second control spool, to provide for connection of the second brake circuit to this counter-pressure chamber, and to establish the fluid supply to the counter-pressure chamber and thus to the second brake circuit through another cross bore and the longitudinal bore. This embodiment lends itself to a particularly simple design.

Finally, it is advantageous from the point of view of design to arrange, in the normal position, for the second control spool to be held against the control housing of the first control spool by a weak spring.

The invention enables achieving a large number of embodiments.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross-section of one embodiment of a brake valve in accordance with the principles of the present invention.

DESCRIPTION OF THE PREFERRED EMBODIMENT

The FIGURE shows schematically a brake system with a brake valve 1 which is actuated by a brake pedal 2. Depression of brake pedal 2 causes isolation of brake circuit 5 leading to two brakes 3 and 4 from an unpressurized reservoir 6 and connection thereof to a fluid source 7.

In the same manner, depression of brake pedal 2 causes isolation of a second brake circuit 8 leading to two brakes 9 and 10 from an unpressurized reservoir 11 and connection thereof to a second fluid source 12.

Brake pedal 2 is mechanically connected to a piston 13 which is displaceably arranged in a housing 14 of brake valve 1. Displaceably arranged in piston 13 is a simulator piston 15 which is preloaded against a collar 17 of piston 13 by a spring 16. Piston 15 is thereby anchored in piston 13. It is, however, able to move towards brake pedal 2 in opposition to the force of spring 16.

A weak spring 26, in the interior of brake valve 1, holds a first control spool 18 in abutment with simulator piston 15. Extending from the control spool's 18 front surface 19, remote from brake pedal 2, is a longitudinal bore 20 which connects with a chamber 22 through a cross bore 21. Chamber 22 feeds pressure fluid into brake circuit 5 through a port 23. Front surface 19 forms a control edge 24 controlling the free cross-section of a reservoir connecting channel 25. In this manner, brake circuit 5 is connectable with reservoir 6 through chamber 22, cross bore 21, longitudinal bore 20 and reservoir connecting channel 25. Connection of brake circuit 5 to fluid source 7 is established through a second cross bore 27 in first control spool 18 and through a fluid connecting channel 28. For design reasons, reservoir connecting channel 25 and fluid connecting channel 28 are not disposed in housing 14 but rather in a control housing 29 which is stationary in and sealed to the inner surface of housing 14.

A pressure chamber 31 is provided between control housing 29 and an annular piston 30 sealed to and displaceable in housing 14. Sealed to and slidable in annular piston 30 is a second control spool 32 having an extension 33 projecting into control housing 29. Longitudinal grooves 34 and 35 are provided in extension 33 so that pressure chamber 31 is in permanent communication with brake circuit 5 through longitudinal bore 20.

Annular piston 30 has a first effective surface 36 providing a boundary for pressure chamber 31 and a second opposed effective surface 38 of equal size providing a boundary for a counter-pressure chamber 37. In the normal position, a weak spring 39 holds annular piston 30 in abutment with a stop 40 formed in housing 14. Counter-pressure chamber 37 has a port 41 through which brake circuit 8 is connected to brake valve 1. Similar to first control spool 18, second control spool 32 has a longitudinal bore 42 and two cross bores 43 and 44. Counter-pressure chamber 37 and thus brake circuit 8 are connectable with fluid source 12 through cross bore 43, longitudinal bore 42 and cross bore 44. Counter-pressure chamber 37 is also connectable with reservoir 11 through cross bore 44, longitudinal bore 42 and a reservoir connecting channel 45. In the normal position, a weak spring 46 holds second control spool 32 in abutment with control housing 29.

For the operation of brake valve 1 constructed in accordance with the invention, an outer collar 47 formed on second control spool 32 is important. Annular piston 30 abuts against collar 47 after movement thereof to overcome a small clearance.

The operation of the brake valve of the invention described is as follows: In the normal position illustrated, brakes 3 and 4 of first brake circuit 5 are connected to reservoir 6, and brakes 9 and 10 of second brake circuit 8 are connected to reservoir 11. Depression of brake pedal 2 causes spring 16 to be loaded so that simulator piston 15 exerts an increasing force on first control spool 18 as it moves towards brake pedal 2. As a result, first control spool 18 is shifted to the left, when viewing the drawing, so that its control edge 24 is able to isolate or block reservoir connecting channel 25.

As first control spool 18 continues its movement to the left, when viewing the drawing, fluid is able to flow from fluid source 7 through fluid connecting channel 28 into cross bore 27 and thus into longitudinal bore 20. Through longitudinal bore 20 the fluid reaches both pressure chamber 31 and chamber 22 from which it is fed to first brake circuit 5 through port 23.

In pressure chamber 31, the fluid acts on both the effective surface 36 of annular piston 30 and the total cross-sectional area of second control spool 32. Annular piston 30 is shifted to the left, when viewing the drawing, until it is in abutment with collar 47 of second control spool 32, causing second control spool 32 to follow its movement to the left, when viewing the drawing. Similar to first control spool 18, movement of second control spool 32 to the left, when viewing the drawing, causes isolation or blocking of reservoir connecting channel 45 and the supply of fluid from fluid source 12 is permitted into longitudinal bore 42 through cross bore 43. From longitudinal bore 42 the fluid flows through cross bore 44 into counter-pressure chamber 37 from where it reaches second brake circuit 8 through port 41. In addition, the pressure in counter-pressure chamber 37 acts on second effective surface 38 of annular piston 30. Since second effective surface 38 is of the same size as first effective surface 36, the forces acting on annular piston 30 are neutralized so that weak spring 39 is again able to shift annular piston 30 back into abutment with stop 40 of housing 14.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake valve comprising:
a housing having a longitudinal axis;
a first control spool disposed in said housing coaxial of said axis to connect a first brake circuit to a first unpressurized reservoir in its rest position and to connect said first brake circuit to a first fluid source in its actuated position;
a second control spool disposed in said housing coaxial of said axis and in tandem relation with said first control spool to connect a second brake circuit to a second unpressurized reservoir in its rest position and to connect said second brake circuit to a second fluid source in its actuated position;
a brake pedal coupled to said first control spool for mechanical actuation thereof;
a pressure chamber disposed in said housing in permanent communication with said first brake circuit for hydraulically actuating said second control spool, said second control spool having a first effective surface in said pressure chamber; and
an annular piston disposed to encircle and slidably sealed to the outer surface of said second control spool, said annular piston having disposed on opposite ends thereof two additional opposed effective surfaces, a first of said two additional effective surfaces being acted upon by pressure in said pressure chamber and a second of said two additional effective surfaces being acted upon by pressure in a counter-pressure chamber in permanent communication with said second brake circuit.

2. A valve according to claim 1, wherein
said annular piston is held in its normal position against a stop formed in the inner surface of said housing by a spring and displaceable by pressure in said pressure chamber acting upon said first of said two additional effective surfaces into abutment with a collar formed on said second control spool adjacent said second of said two additional effective surfaces against the force of said spring when said brake valve is actuated.

3. A valve according to claim 2, wherein
said two additional effective surfaces are of equal size.

4. A valve according to claim 1, wherein
said two additional effective surfaces are of equal size.

5. A valve according to claim 1, wherein
said permanent communication between said pressure chamber and said first brake circuit includes
a first longitudinal bore disposed in said first control spool extending from an end of said first control spool adjacent said pressure chamber toward the other end of said first control spool adjacent said brake pedal, and
a first cross bore disposed in said first control spool connected between said first longitudinal bore adjacent said brake pedal and said first brake circuit.

6. A valve according to claim 5, further including
a control housing sealed to the inner surface of said housing into which said first control spool projects, and
wherein
said second control spool includes
an extension on one end thereof adjacent said first control spool projecting into said control housing, and
longitudinal grooves disposed in said extension to provide a fluid connection between said first longitudinal bore and said pressure chamber.

7. A valve according to claim 6, wherein
said one end of said first control spool provides a control edge for a reservoir connecting channel disposed in said control housing.

8. A valve according to claim 7, further including
a second longitudinal bore disposed in said second control spool having one end thereof coupled to said second reservoir,
a second cross bore disposed in said second control spool having one end thereof connected to the other end of said second longitudinal bore and the other end thereof connected to said counter-pressure chamber,
said second longitudinal bore and said second cross bore providing a fluid connection between said second reservoir and said counter-pressure chamber, and
a third cross bore disposed in said second control spool having one end thereof coupled to said second fluid source and the other end thereof connected to said second longitudinal bore intermediate the ends thereof,
said third cross bore and said second longitudinal bore providing fluid for said counter-pressure chamber and, hence, said second brake circuit upon actuation of said brake valve.

9. A valve according to claim 8, wherein
said second control spool is held against said control housing in its normal position by a spring bearing against an end of said second control spool remote from said extension.

10. A valve according to claim 1, further including
a control housing sealed to the inner surface of said housing into which said first control spool projects, and
wherein
said second control spool includes
an extension on one end thereof adjacent said first control spool projecting into said control housing, and
longitudinal grooves disposed in said extension to provide a fluid connection between said pressure chamber and said first brake circuit.

11. A valve according to claim 10, wherein
said one end of said first control spool provides a control edge for a reservoir connecting channel disposed in said control housing.

12. A valve according to claim 11, further including
a longitudinal bore disposed in said second control spool having one end thereof coupled to said second reservoir,
a first cross bore disposed in said second control spool having one end thereof connected to the other end of said longitudinal bore and the other end thereof connected to said counter-pressure chamber,
said longitudinal bore and said first cross bore providing a fluid connection between said second reservoir and said counter-pressure chamber, and
a second cross bore disposed in said second control spool having one end thereof coupled to said second fluid source and the other end thereof connected to said longitudinal bore intermediate the ends thereof,
said second cross bore and said longitudinal bore providing fluid for said counter-pressure chamber and, hence, said second brake circuit upon actuation of said brake valve.

13. A valve according to claim 12, wherein
said second control spool is held against said control housing in its normal position by a spring bearing against an end of said second control spool remote from said extension.

14. A valve according to claim 1, further including
a longitudinal bore disposed in said second control spool having one end thereof coupled to said second reservoir,
a first cross bore disposed in said second control spool having one end thereof connected to the other end of said longitudinal bore and the other end thereof connected to said counter-pressure chamber,
said longitudinal bore and said first cross bore providing a fluid connection between said second reservoir and said counter-pressure chamber, and
a second cross bore disposed in said second control spool having one end thereof coupled to said second fluid source and the other end thereof connected to said longitudinal bore intermediate the ends thereof,
said second cross bore and said longitudinal bore providing fluid for said counter-pressure chamber and, hence, said second brake circuit upon actuation of said brake valve.

* * * * *